United States Patent [19]

Berchtold

[11] Patent Number: 4,703,261

[45] Date of Patent: Oct. 27, 1987

[54] DIFFERENTIAL HALL-EFFECT GEAR MEASURE FEELER

[75] Inventor: Nikolaus Berchtold, Zürich, Switzerland

[73] Assignee: Maag Gear-Wheel and Machine Company Limited, Zürich, Switzerland

[21] Appl. No.: 680,363

[22] Filed: Dec. 11, 1984

[30] Foreign Application Priority Data

Dec. 15, 1983 [CH] Switzerland ........................ 6686/83

[51] Int. Cl.[4] ........................ G01B 7/14; H03K 17/90; H03K 19/18

[52] U.S. Cl. ........................................ 324/207; 33/558; 307/309

[58] Field of Search ........................ 324/207, 208, 251; 338/32 H; 33/558, 561; 307/309

[56] References Cited

U.S. PATENT DOCUMENTS 3,331,971 7/1967 Möller ............................ 338/32 H 3,622,898 11/1971 Salmon ............................ 324/251

4,528,758 7/1985 Berchtold ............................ 33/558

FOREIGN PATENT DOCUMENTS 0027082 2/1982 Japan ............................ 338/32 H

*Primary Examiner*—Reinhard J. Eisenzopf

*Assistant Examiner*—Walter E. Snow

*Attorney, Agent, or Firm*—Werner W. Kleeman

[57] ABSTRACT

The measuring system of the gear measuring feeler contains, as a Hall-effect sensor, two Hall-effect sensor elements which are arranged in opposing relationship to each other in the magnetic field. The differential output signal of this dual Hall-effect sensor is processed in a matching circuit which is designed as a differential amplifier circuit, to yield a measuring voltage with respect to zero volt. This measuring voltage is twice as high as in the case where only one Hall-effect sensor element is used as the Hall-effect sensor. Furthermore, the matching circuit is of a simpler structure and the measurement is substantially more precise since there is not required any reference voltage source in the matching circuit.

6 Claims, 3 Drawing Figures

+V
Hall effect sensor
50
Matching circuit
56
A
0V 14
52
54
66
72
10
12
10B
50A
50B
60
Matching circuit
60
58
56
10A
50
54

DIFFERENTIAL HALL-EFFECT GEAR MEASURE FEELER

CROSS-REFERENCE TO RELATED APPLICATIONS

This application is related to the commonly assigned, copending U.S. application Ser. No. 06/560,999, filed Dec. 13, 1983, and entitled: "GEAR MEASURING FEELER", now U.S. Pat. No. 4,528,758, granted July 16, 1985, and the commonly assigned, copending U.S. application Ser. No. 06/682,089, filed Dec. 17, 1984, and entitled "TOOTH FLANK PROFILE MEASURING APPARATUS CONTAINING A FEELER FOR DETERMINING THE SURFACE ROUGHNESS OF A TOOTH FLANK," now U.S. Pat. No. 4,552,014, granted Nov. 12, 1985.

BACKGROUND OF THE INVENTION

The present invention relates to a new and improved construction of gear measuring feeler.

In its more particular aspects, the present invention relates specifically to a new and improved construction of gear measuring feeler including a feeler rod which is pivotably mounted in a housing. This feeler rod supports a feeler probe at one of its ends and, at the other one of its ends, one of two relatively movable members of a measuring system. The measuring system generates a magnetic field and delivers electrical signals which are proportional to the deflection of the feeler probe, to a matching circuit standardizing the electrical signals. The two relatively movable members of the measuring system comprise means for generating a static magnetic field and a Hall-effect sensor, respectively, and the matching circuit is mounted at the housing.

In such a gear measuring feeler, as disclosed in the aforementioned commonly assigned, copending U.S. application Ser. No. 06/560,999, now U.S. Pat. No. 4,528,758 the matching circuit or electronic component 56 which is connected to the output of the Hall-effect sensor 50 essentially comprises a zero compensation circuit 74 and two series-connected operational amplifiers 76 and 78. The zero compensation accomplished by means of the zero compensation circuit 74 is required in such gear measuring feeler because the Hall-effect sensor 50 is only operated at one d.c.-voltage level, whereas during measurements at tooth flanks with such gear measuring feeler a deflection of the feeler probe must be measured from a pre-adjusted zero position in the plus-direction or minus-direction. Since, on the one hand, only a unidirectional voltage is present in the form of the d.c.-voltage and since, on the other hand, the measured voltage at the output should be as informative as possible, i.e. a deflection, for instance, to the left should generate a positive voltage and a deflection to the right a negative voltage, the output voltage of the Hall-effect sensor 50 must be symmetrized. For this purpose the zero compensation circuit 74 supplies a voltage which is added to the output voltage of the Hall-effect sensor 50 before this output voltage is fed to the operational amplifier 76. The zero compensation circuit 74 contains a reference voltage transmitter 80 which supplies a thermally stable voltage independently of eventual fluctuations of its current supply source. Furthermore, the zero compensation circuit contains a potentiometer P2 at which the zero compensation voltage can be adjusted such that no mechanical fine adjustment or tuning of the measuring system is required.

Uncertainties with respect to the measuring result can occur in the gear measuring feeler according to the initially cross-referenced commonly assigned, copending U.S. patent application if the zero compensation circuit 74 and the remaining parts of the measuring circuit do not have exactly the same temperature drift. Common mode or in-phase voltages can result from the Hall-effect sensor which must be suppressed by special additional measures. It has furthermore been found that the measuring result could be further improved if it were possible to increase the output voltage of the Hall-effect sensor, i.e. its sensitivity in terms of millivolt per micrometer feeler probe deflection.

SUMMARY OF THE INVENTION

Therefore, with the foregoing in mind it is a primary object of the present invention to provide a new and improved gear measuring feeler in which no measuring uncertainty is caused by temperature drift effects within the measuring circuit.

Another important object of the present invention is directed to the provision of a new and improved gear measuring feeler in which common mode or in-phase voltages can be suppressed in a more simple manner.

Still a further important object of the present invention is directed to the provision of a new and improved gear measuring feeler in which a higher output voltage of the Hall-effect sensor is obtained.

Now in order to implement these and still further objects of the invention, which will become more readily apparent as the description proceeds, the gear measuring feeler of the present development is manifested by the features that, the Hall-effect sensor has a differential output, and the matching circuit is designed as a differential amplifier circuit.

By using the inventive Hall-effect sensor with a differential output the reference voltage source can be dispensed with and which is otherwise required in the matching circuit or electronic component of the gear measuring feeler disclosed in the initially cross-referenced U.S. patent application Ser. No. 06/560,999. There are achieved the following further advantages: the measuring output voltage of the Hall-effect sensor floats with respect to zero volt. The measuring voltage thus generated, therefore, can be measured in a differential mode. Common mode or in-phase voltages are thus suppressed by means of the differential amplifier circuit. Consequently, the measurements will be more precise because uncertainties which originate from different temperature coefficients, for instance of the Hall-effect sensor and of the reference voltage source, are eliminated and because twice the absolute value of the measuring output voltage is available.

Preferably, the Hall-effect sensor can be provided in a simple manner by simply mechanically and fixedly interconnecting two identical Hall-effect sensor elements of the kind as used in the gear measuring feeler according to the initially cross-referenced U.S. patent application Ser. No. 06/560,999. The two Hall-effect sensor elements are interconnected in such a manner that their Hall-effect generators are arranged in opposing relationship to each other with respect to the magnetic field.

In a further preferred embodiment of the invention a dual Hall-effect sensor is obtained by simply securing to each other two conventional Hall-effect sensors at the same sides thereof.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Describing now the drawings, it is to be understood that only enough of the construction of the gear measuring feeler has been shown as needed for those skilled in the art to readily understand the underlying principles and concepts of the present development, while simplifying the showing of the drawings. Turning attention now specifically to FIG. 1, there has been schematically illustrated a Hall-effect sensor 50 having a differential output and the output signal of which is processed in a matching circuit which is designed as a differential amplifier circuit 56. In the most simple case the Hall-effect sensor 50 illustrated in FIG. 1 may comprise two Hall-effect generators which are arranged in space in such a manner as to be in opposing relationship with respect to the direction of the magnetic field. The opposing spatial relationship between the two Hall-effect generators results in the generation of the desired differential output signal. In comparison to a Hall-effect sensor comprising only one Hall-effect generator the inventive Hall-effect sensor containing two Hall-effect generators and a differential output generates twice as large an output signal and there thus results an improved signal-to-noise ratio.

Figure 1:
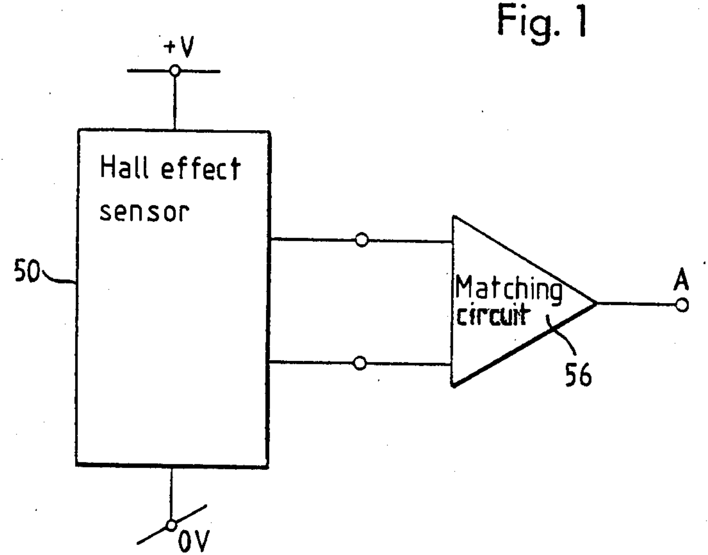
FIG. 1 is a block circuit diagram showing the principle of the circuit structure in the inventive gear measuring feeler.

The differential amplifier circuit 56 illustrated in FIG. 1 may be of known design. In the following a specific construction of the differential amplifier circuit 56 is described which is particularly suited for use in combination with the exemplary embodiment of the gear measuring feeler illustrated in FIG. 2. In this specific design the Hall-effect sensor essentially consists of two separate Hall-effect sensor elements 50A and 50B which are spatially in opposing relationship to each other and which are firmly interconnected on the same sides thereof.

Figure 2:
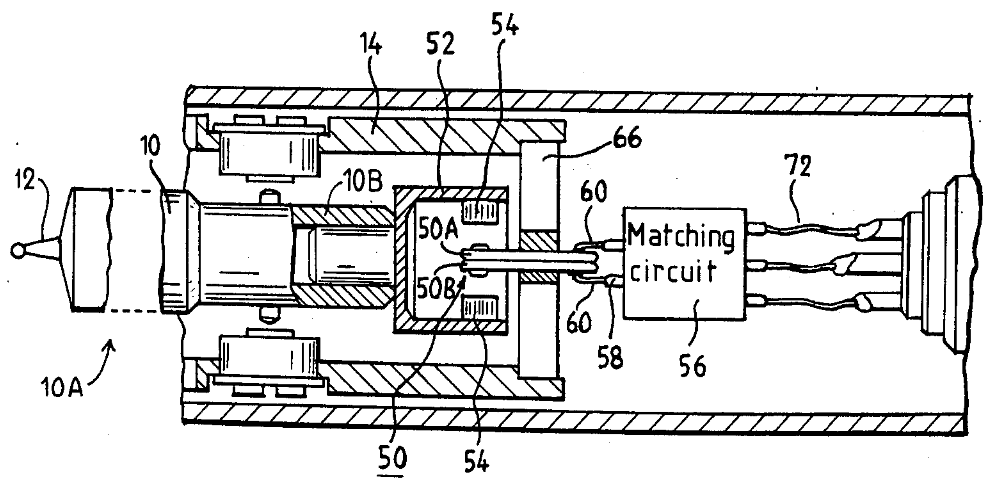
FIG. 2 is a partial sectional view of an exemplary embodiment of the inventive gear measuring feeler.

FIG. 2 shows part of a longitudinal sectional view of an exemplary embodiment of the gear measuring feeler in which the section is in the horizontal pivoting plane of a feeler rod 10. This feeler rod 10 is pivotably mounted in a housing 14, so as to be deflectable from a predetermined position. This pivotable mounting of the feeler rod 10 is described in detail in the initially cross-referenced U.S. patent application Ser. No. 06/560,999 and thus such description thereof is incorporated herein by reference in order to avoid undue repetition.

The measuring system of the gear measuring feeler comprises the Hall-effect sensor which is designated in its entirety by reference numeral 50, two permanent magnets 54 which are arranged in a magnet support 52 on two diametrically opposed sides of the Hall-effect sensor 50 and in a spaced relationship thereto, and a matching circuit 56 forming an electronic component or part with connecting sockets 58 into which related connecting pins 60 of the Hall-effect sensor 50 are inserted. As described in the initially cross-referenced U.S. patent application Ser. No. 06/560,999, the permanent magnets 54 constitute robust magnets made of a samarium-cobalt alloy which generate a very high field strength or intensity and which have a particularly high long-term stability. The magnet support 52 is fixedly connected to the second end 10B of the feeler rod 10 which is the right-hand end in FIG. 2 and which second end 10B is located remote from a first end 10A of the feeler rod 10 which carries a feeler probe 12. The permanent magnets 54 are arranged at the magnet support 52 in such a manner that the like poles of the permanent magnets 54 face each other.

Figure 3:
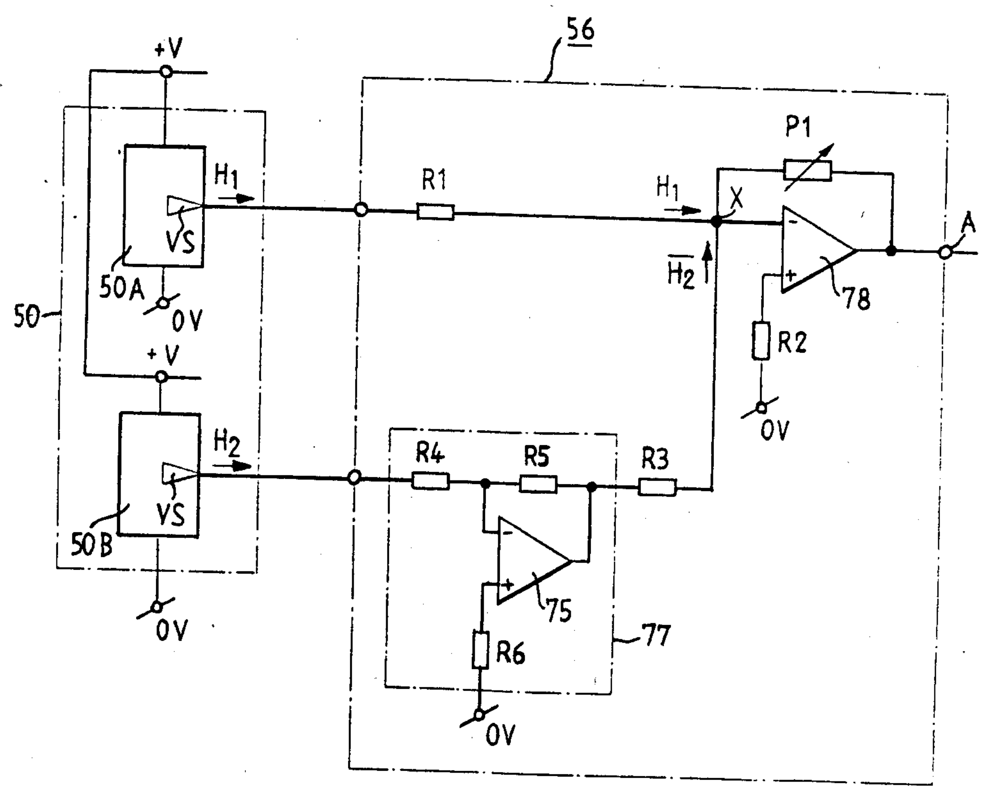
FIG. 3 is an electrical circuit diagram showing the circuit structure of the gear measuring feeler illustrated in FIG. 2.

The Hall-effect sensor 50 illustrated in FIG. 2 comprises the two Hall-effect sensor elements 50A and 50B, each of which constitutes an integrated circuit on a ceramic plate or platelet containing the actual Hall-effect generator as well as a voltage regulator and an amplifier VS, see also FIG. 3. The electric circuits arranged at the ceramic plates or platelets are connected via the connecting pins 60 and the connecting sockets 58 to the differential amplifier circuit 56 which will be described hereinbelow with reference to FIG. 3. The two ceramic plates or platelets are adhesively bonded to each other in such a manner that the Hall-effect generators of the two Hall-effect sensor elements 50A and 50B are rotated by 180° with respect to each other, i.e. with respect to the magnetic field generated by the permanent magnets 54 the Hall-effect sensor elements 50A and 50B are spatially arranged in opposing relationship. The Hall-effect sensor 50 is mounted at a holder 66 which, in turn, is secured to the housing 14 of the gear measuring feeler. This holder 66 may be made of, for instance, light metal or a light metal alloy. The Hall-effect sensor 50 is thereby immovably mounted at the gear measuring feeler, whereas the magnet holder 52 moves relative to the Hall-effect sensor 50 when the feeler rod 10 is pivoted or deflected. The differential amplifier circuit 56 is also immovably mounted due to the connecting pins 60 which are inserted into the connecting sockets 58. If desired, an additional mounting member for the electronic part containing the differential amplifier circuit 56 can be provided at the holder 66. The output of the differential amplifier circuit 56 is connected to connecting sockets of the gear measuring feeler via connecting wires or leads 72.

The structure of the circuit containing the Hall-effect sensor 50 and the differential amplifier circuit 56 is shown in FIG. 3. The Hall-effect sensor 50 comprises the two Hall-effect sensor elements 50A and 50B which are connected in parallel to a suitable voltage supply source. Since each one of the two Hall-effect sensor elements 50A and 50B constitutes a conventional element, the structure thereof need not be here described in detail. In FIG. 3 only the amplifier VS is indicated which is already integrated with each one of the Hall-effect sensor elements 50A and 50B.

The differential amplifier circuit 56 receives the differential output signals H1 and H2, respectively, of the Hall-effect sensor elements 50A and 50B and delivers at its output A a signal with respect to zero volt and which corresponds to the differential output signal of the Hall-effect sensor 50. In the presently illustrated exemplary embodiment the differential amplifier circuit 56 contains an inverter circuit 77 and an operational amplifier 78. The output of the Hall-effect sensor element 50A is connected via a resistor R1 to the inverting input (−) of the operational amplifier 78. The output of the operational amplifier 78 is feed-back connected to this inverting input (−) thereof via a potentiometer P1 for adjusting the gain and via a connection point or junction X. The non-inverting input (+) of the operational amplifier 78 is connected to the zero-volt side OV of the voltage supply source via a resistor R2.

The output of the Hall-effect sensor element 50B is connected to the input of the inverter circuit 77 and the output of which is connected via a resistor R3 to the connecting point or junction X, and thus, to the inverting input (−) of the operational amplifier 78. The inverter circuit 77 contains an inverting amplifier 75.

The output of the Hall-effect sensor element 50B is connected via a resistor R4 to the inverting input (−) of the inverting amplifier 75, the output of which is feed-back connected to this inverting input (−) via a resistor R5. The non-inverting input (+) of the inverting amplifier 75 is connected to the zero volt side OV of the voltage supply source via a resistor R6. It is a specific feature of the inverter circuit 77 that the amplification or gain thereof amounts to 1.

During operation the output signal H1 of the Hall-effect sensor element 50A is directly supplied via the resistor R1 to the inverting input (−) of the operational amplifier 78 while there is also supplied to this inverting input (−) the output signal of the Hall-effect sensor element 50B via the inverter circuit 77 and the resistor R3, i.e. in the inverted from H2. The operational amplifier 78 thus receives at its inverting input (−) the sum of the magnitudes or levels of the two output signals of the Hall-effect sensor elements 50A and 50B and delivers, after desired amplification, this sum as the output signal at the output A thereof. The inverting amplifier 75 and the operational amplifier 78 which are contained in the illustrated differential amplifier circuit 56 can also be designed as an integrated circuit. In the presently described gear measuring feeler the zero-point adjustment is not effected in an electrical manner as provided in the gear measuring feeler according to the initially cross-referenced U.S. patent application Ser. No. 06/560,999, but is obtained in a mechanical manner by appropriately adjusting the Hall-effect sensor 50 between the permanent magnets 54 in order to thus realize a simple design of the matching circuit 56.

In the embodiment of the inventive gear measuring feeler and as illustrated in FIG. 3, the following elements or components have been used:

| Reference Numeral | Electrical Component | Num. Value | Type |
|---|---|---|---|
| 75, 78 | Inverting and Operational Amplifier | | IC 1458 |
| P1 | Wire Potentiometer | 10 | |
| R1 | Resistor | 10 | |
| R2 | Resistor | 5.1 | |
| R3 | Resistor | 10 | |
| R4 | Resistor | 10 | |
| R5 | Resistor | 10 | |
| R6 | Resistor | 5.1 | |

-continued

| Reference Numeral | Electrical Component | Num. Value | Type |
|---|---|---|---|
| 50A, 50B | Hall-effect Sensor Elements | | 92 SS 12.2 (Honeywell) |

The resistances are given in kiloohms and each resistor is a film resistor having an electrical power of ⅛ watt.

While there are shown and described present preferred embodiments of the invention, it is to be distinctly understood that the invention is not limited thereto, but may be otherwise variously embodied and practiced within the scope of the following claims. Accordingly,

What I claim is:

1. A gear measuring feeler comprising:

a housing;

a feeler rod pivotably mounted in said housing and deflectable from a predetermined position;

said feeler rod having a first end and a second end;

a feeler probe provided at said first end of said feeler rod;

a measuring system comprising two members which are movable relative to each other;

one of said two members being supported at said second end of said feeler rod;

said two members comprising means for generating a static magnetic field and a Hall-effect sensor;

said Hall-effect sensor containing two Hall-effect sensor elements and having a differential output;

said measuring system generating electrical signals proportional to the deflection of said feeler rod from said predetermined position thereof;

a matching circuit operatively connected to said measuring system to receive and standardize said electrical signals and having an input side and an output side; and said matching circuit having said input side connected with said differential output of said Hall-effect sensor and containing a differential amplifier circuit which is mounted at said housing and which receives the sum of the absolute values of the output voltages generated by said two Hall-effect sensor elements and delivers at said output side a corrected signal.

2. The gear measuring feeler as defined in claim 1, wherein:

said two Hall-effect sensor elements are spatially arranged in opposing relationship to each other with respect to said static magnetic field.

3. The gear measuring feeler as defined in claim 2, wherein:

said two Hall-effect sensor elements constitute two separate, mechanically fixedly interconnected elements.

4. The gear measuring feeler as defined in claim 2, wherein:

each one of said two Hall-effect sensor elements comprises a predetermined side thereof; and said two Hall-effect sensor elements possessing identical predetermined sides and said two Hall-effect sensor elements being secured to each other at said identical predetermined sides thereof.

5. The gear measuring feeler as defined in claim 1, wherein:

said matching circuit contains an inverter circuit interconnecting one of said Hall-effect sensor elements and said differential amplifier circuit.

6. A gear measuring feeler comprising:

a housing:

a feeler rod pivotably mounted in said housing and deflectable from a predetermined position;

said feeler rod having a first end and a second end;

a feeler probe provided at said first end of said feeler rod;

a measuring system comprising two members which are movable relative to each other;

one of said two members being supported at said second end of said feeler rod;

said two members comprising means for generating a static magnetic field and a Hall-effect sensor;

said Hall-effect sensor containing two Hall-effect sensor elements and having a differential output for delivering a differential output signal;

said measuring system generating electrical signals proportional to the deflection of said feeler rod from said predetermined position thereof;

a matching circuit operatively connected to said measuring system to receive and standardize said electrical signals and having an input side and an output side;

said matching circuit being devoid of a reference voltage source; and said matching circuit having said input side connected with said differential output of said Hall-effect sensor and containing a differential amplifier circuit which is mounted at said housing and which received the sum of the absolute values of the output voltages generated by said two Hall-effect sensor elements and delivers at said output side an output signal substantially corresponding to said differential output signal of the Hall-effect sensor.

* * * * *

UNITED STATES PATENT AND TRADEMARK OFFICE
CERTIFICATE OF CORRECTION

PATENT NO. : 4,703,261

DATED : October 27, 1987

INVENTOR(S) : NIKOLAUS BERCHTOLD

It is certified that error appears in the above-identified patent and that said Letters Patent is hereby corrected as shown below:

Front page, Section [54], please change the title to read --DIFFERENTIAL HALL-EFFECT GEAR MEASURING FEELER--

Column 1, line 1 (in the title), please change "MEASURE" to --MEASURING--

Column 5, line 37, please change "H2" to --$\overline{H2}$--

Signed and Sealed this

Twenty-ninth Day of March, 1988

*Attest:*

DONALD J. QUIGG

*Attesting Officer*

*Commissioner of Patents and Trademarks*